(12) United States Patent
Yu et al.

(10) Patent No.: US 11,809,033 B2
(45) Date of Patent: Nov. 7, 2023

(54) DISPLAY PANEL AND DISPLAY DEVICE

(71) Applicant: Wuhan China Star Optoelectronics Technology Co., Ltd., Wuhan (CN)

(72) Inventors: Pengfei Yu, Hubei (CN); Tao Song, Hubei (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 644 days.

(21) Appl. No.: 16/966,161

(22) PCT Filed: Apr. 9, 2020

(86) PCT No.: PCT/CN2020/083855
§ 371 (c)(1),
(2) Date: Jul. 30, 2020

(87) PCT Pub. No.: WO2021/114525
PCT Pub. Date: Jun. 17, 2021

(65) Prior Publication Data
US 2023/0161190 A1    May 25, 2023

(30) Foreign Application Priority Data

Dec. 13, 2019   (CN) .......................... 201911289095.2

(51) Int. Cl.
*G02F 1/1335*   (2006.01)
*G02F 1/1339*   (2006.01)
(Continued)

(52) U.S. Cl.
CPC ...... *G02F 1/133512* (2013.01); *G02F 1/1368* (2013.01); *G02F 1/13394* (2013.01);
(Continued)

(58) Field of Classification Search
CPC ........... G02F 1/133512; G02F 1/13398; G02F 1/13396; G02F 1/13394; G02F 1/133514;
(Continued)

(56) References Cited

U.S. PATENT DOCUMENTS

2008/0230788 A1    9/2008  Fan Jiang et al.
2012/0206669 A1 *  8/2012  Kim .................. G02F 1/133308
                                                      349/153
(Continued)

FOREIGN PATENT DOCUMENTS

| CN | 109856849 |   | 6/2009  |         |              |
|----|-----------|---|---------|---------|--------------|
| CN | 105353567 |   | 2/2016  |         |              |
| CN | 106324925 | A | * 1/2017 | ......... | G02F 1/13394 |
| CN | 108957868 |   | 12/2018 |         |              |
| CN | 108957868 | A | * 12/2018 | ........... | G02F 1/1333 |

(Continued)

*Primary Examiner* — Hoan C Nguyen

(57) ABSTRACT

A display panel and a display device are disclosed. In preparing the display panel, based on a height difference formed between a plurality of first column spacers and a plurality of second column spacers, as a color filter substrate deforms during a vacuum assembly process, a deformation area of a blind hole area increases because the second column spacers are not in contact with an array substrate in the blind hole area, resulting in a decrease in a radius of curvature of the deformation of the blind hole area, so that an amount of deformation is reduced and poor focusing due to Newton's ring effect on the blind hole can be prevented.

18 Claims, 2 Drawing Sheets

(51) Int. Cl.
*G02F 1/1343* (2006.01)
*G02F 1/1368* (2006.01)

(52) U.S. Cl.
CPC ...... *G02F 1/13396* (2021.01); *G02F 1/13398* (2021.01); *G02F 1/13439* (2013.01); *G02F 1/133514* (2013.01)

(58) Field of Classification Search
CPC .. G02F 1/13439; G02F 1/1368; G02F 1/1333; G02F 1/13318; G02F 2203/30; G02F 1/133502; G02F 1/133528; G02F 1/1339; G02F 1/133345; G02F 1/13312; H04M 1/0264; H04M 1/0266; H04N 23/57; G03B 17/02
See application file for complete search history.

(56) References Cited

U.S. PATENT DOCUMENTS

| | | | |
|---|---|---|---|
| 2016/0259205 A1 | 9/2016 | Kwak et al. | |
| 2020/0174301 A1* | 6/2020 | Tien | H04M 1/0264 |
| 2020/0333650 A1* | 10/2020 | Ma | G02F 1/13394 |

FOREIGN PATENT DOCUMENTS

| | | | | |
|---|---|---|---|---|
| CN | 109100891 A | * | 12/2018 | ........... G02F 1/1333 |
| CN | 109164647 A | * | 1/2019 | ........... G02F 1/1333 |
| CN | 109188786 | | 1/2019 | |
| CN | 109307962 | | 2/2019 | |
| CN | 109946885 | | 6/2019 | |
| CN | 110045533 | | 7/2019 | |
| CN | 110244483 | | 9/2019 | |
| CN | 112014991 A | * | 12/2020 | ........... G02F 1/1333 |
| KR | 20070051415 A | * | 5/2007 | |

* cited by examiner

DISPLAY PANEL AND DISPLAY DEVICE

RELATED APPLICATIONS

This application is a National Phase of PCT Patent Application No. PCT/CN2020/083855 having International filing date of Apr. 9, 2020, which claims the benefit of priority of Chinese Patent Application No. 201911289095.2 filed on Dec. 13, 2019. The contents of the above applications are all incorporated by reference as if fully set forth herein in their entirety.

FIELD AND BACKGROUND OF THE INVENTION

The present invention relates to a technical field of displays, and particularly to, a display panel and a display device.

Current in-plane camera opening technologies for display panels in industries are divided into a through hole type and a blind hole type. The through hole type is implemented by reserving in-plane round hole space in advance in glass substrates, color filter substrates, and array substrates during coating, and forming round holes in the round hole space by cutting along with grinding processes, thereby achieving in-plane opening design for liquid crystal display (LCD) products. Likewise, the blind hole type is implemented by reserving in-plane round hole space in advance in glass substrates, color filter substrates, and array substrates during coating, and performing a hole formation process on the round hole space without causing damage to glass substrates, color filter substrates, and array substrates. When cell assembly is in progress, liquid crystal is added to the round holes to form a circular light-transmissive area on the glass substrates to achieve the in-plane blind hole design for LCD products.

In processing liquid crystal, it is necessary to ensure light transmittance of blind holes. Due to the need to hollow out part of film layers in a blind hole area, a height of a liquid crystal layer in the blind hole area is caused to be different from a height of the liquid crystal layer in a normal display area. However, an amount of liquid crystal dropped in an entire LCD panel remains unchanged, so that when a color filter substrate and an array substrate are in a process of vacuum assembly, the glass substrate in the blind hole area will sink inwards due to the vacuum assembly, resulting in a concave lens effect produced by the color filter substrate and the array substrate in the blind hole area. In addition, when a glass on a side of the color filter substrate is bonded to a cover glass, thickness of a photoresist in the blind hole area is the same as that of a photoresist in a display area, but there is a difference in a fill height of the photoresist. During a vacuum bonding process, the concave lens effect is becoming significant, giving rise to an abnormal focus of a camera under a round hole, thereby adversely affecting shooting performance of the camera.

SUMMARY OF THE INVENTION

An object of the present invention is to provide a display panel and a display device. In preparing the display panel, based on a height difference formed between a plurality of second column spacers and a plurality of first column spacers, as a color filter substrate deforms during a vacuum assembly process, a deformation area of a blind hole area increases because the second column spacers are not in contact with an array substrate in the blind hole area, resulting in a decrease in a radius of curvature of the deformation of the blind hole area, thereby reducing an amount of deformation and avoiding poor focusing due to Newton's ring effect on the blind hole.

To achieve the above-mentioned object, the present invention provides a display panel, comprising an array substrate comprising a blind hole area and a display area, wherein the blind hole area has an inner diameter area and an outer diameter area surrounding the inner diameter area; a liquid crystal layer disposed on the array substrate and comprising a plurality of first column spacers and a plurality of second column spacers, wherein the first column spacers have a height greater than that of the second column spacers; and a color filter substrate disposed on a side of the liquid crystal layer away from the array substrate; wherein the first column spacers are disposed in the display area, one end of each of the first column spacers is connected to the array substrate, the other end is connected to the color filter substrate, and the second column spacers are disposed in the display area and the outer diameter area.

Further, the first column spacers are made of an organic photoresist, and/or the second column spacers are made of an organic photoresist.

Further, the first column spacers are provided with a height difference between 0.35 microns ($\mu$m) and 0.45 $\mu$m with the second column spacers.

Further, the second column spacers and the first column spacers are staggered in the display area.

Further, the array substrate comprises a first glass substrate; a buffer layer disposed on the first glass substrate; a thin-film transistor layer disposed on the buffer layer and provided with a first combined hole corresponding to the blind hole area, wherein the first combined hole extends through the thin-film transistor layer to a surface of the buffer layer; and a first alignment film disposed on the thin-film transistor layer in the first combined hole.

Further, the first combined hole comprises a first through hole and a second through hole, wherein the first through hole has a radius less than that of the second through hole, and the second through hole is provided above the first through hole and surrounds the first through hole.

Further, the color filter substrate comprises a second glass substrate; a black matrix layer disposed on a side of the second glass substrate adjacent to the array substrate; a transparent electrode layer disposed on the black matrix layer; an RGB color resist disposed in the black matrix layer and the transparent electrode layer, wherein the RGB color resist comprises a second combined hole corresponding to the blind hole area, and the second combined hole extends through the transparent electrode layer and the black matrix layer to a surface of the second glass substrate; and a second alignment film disposed on the transparent electrode layer in the second combined hole.

Further, the second combined hole comprises a third through hole and a fourth through hole, wherein the third through hole has a radius less than that of the fourth through hole, the third through hole is provided above the fourth through hole, and the fourth through hole surrounds the third through hole.

Further, the black matrix layer surrounds the third through hole, and the transparent electrode layer surrounds the fourth through hole.

The present invention further provides a display device, comprising the aforementioned display panel and a camera, wherein the camera is disposed below the display panel and corresponding to the blind hole area.

The present invention has advantageous effects as follows: the present invention provides a display panel and a display device, wherein a plurality of second column spacers are provided in both an outer diameter area and a display area adjacent to the outer diameter area. In preparing the display panel, based on a height difference formed between a plurality of second column spacers and a plurality of first column spacers, as a color filter substrate deforms during a vacuum assembly process, a deformation area of a blind hole area increases because the second column spacers are not in contact with an array substrate in the blind hole area, resulting in a decrease in a radius of curvature of the deformation of the blind hole area, thereby reducing an amount of deformation, avoiding poor focusing due to Newton's ring effect on the blind hole, and further improving shooting quality of the display device.

BRIEF DESCRIPTION OF THE SEVERAL VIEWS OF THE DRAWINGS

To better illustrate embodiments or technical solutions in the prior art, a brief description of the drawings used in the embodiments or the prior art description will be given below. Obviously, the accompanying drawings in the following description merely show some embodiments of the present invention, and a person skilled in the art may still derive other drawings from these accompanying drawings without creative efforts.

DESCRIPTION OF SPECIFIC EMBODIMENTS OF THE INVENTION

Figure 1:
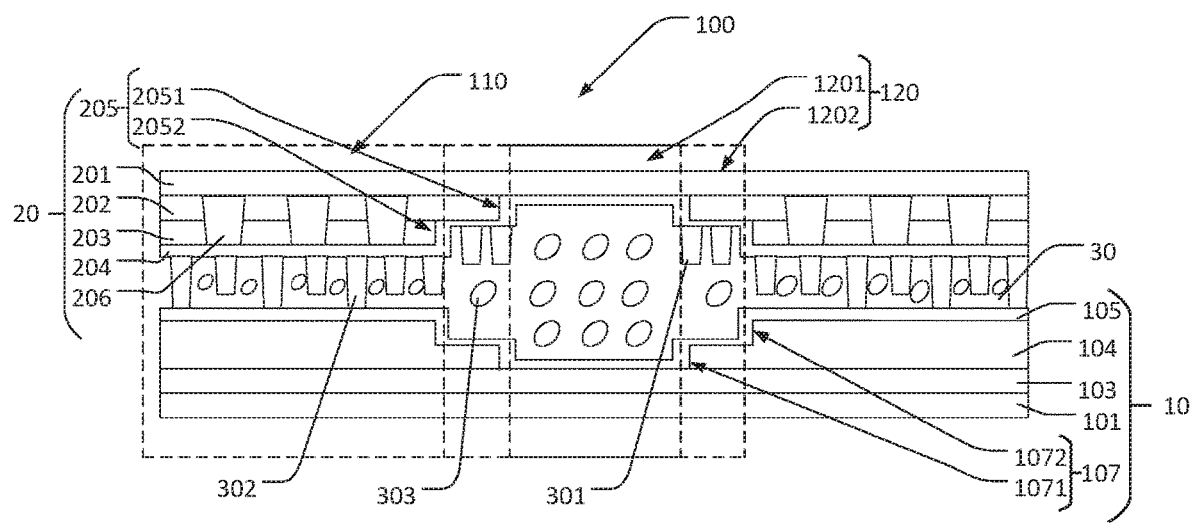
FIG. 1 is a schematic structural view of a display panel provided by the present invention.

The following embodiments are referring to the accompanying drawings for exemplifying specific implementable embodiments of the present invention. Directional terms described by the present invention, such as upper, lower, front, back, left, right, inner, outer, side, etc., are only directions by referring to the accompanying drawings. The terms of elements mentioned in the present invention, such as first and second, are only to distinguish different components, which may be better expressed. In the figure, modules with similar structure are indicated by the same reference numerals.

Herein, embodiments of the present invention will be described in detail with reference to the drawings. The present invention can be embodied in many different forms, and the present invention should not be interpreted merely as the specific embodiments set forth herein. The embodiments of the present invention are provided to explain the actual application of the present invention, so that those skilled in the art can understand various embodiments of the present invention and various modifications suitable for specific intended applications.

As shown in FIG. 1, the present invention provides a display panel 100 including an array substrate 10, a liquid crystal layer 30, and a color filter substrate 20.

The array substrate 10 includes a blind hole area 120 and a display area 110. The blind hole area 120 has an inner diameter area 1201 and an outer diameter area 1202 surrounding the inner diameter area 1201.

The liquid crystal layer 30 is disposed on the array substrate 10 and includes at least a first column spacer 302 and at least a second column spacer 301. The first column spacer 302 has a height greater than that of the second column spacer 301. In this embodiment, as shown in FIG. 1, the liquid crystal layer 30 includes a plurality of the first column spacers 302 and a plurality of the second column spacers 301.

The color filter substrate 20 is disposed on a side of the liquid crystal layer 30 away from the array substrate 10.

The first column spacers 302 are disposed in the display area 110, one end of each of the first column spacers 302 is connected to the array substrate 10, and the other end is connected to the color filter substrate 20 so that a space is created by support of the column spacers for the liquid crystal layer 30. Generally, the column spaces function to provide supporting for cell-assembly.

The second column spacers 301 are disposed in the display area 110 and the outer diameter area 1202. One end of each of the second column spacers 301 is connected to the color filter substrate 20, and the other end keeps a spacing with the array substrate 10. That is, the other end of each of the second column spacers 301 is suspended in no contact with the array substrate 10.

Figure 2:
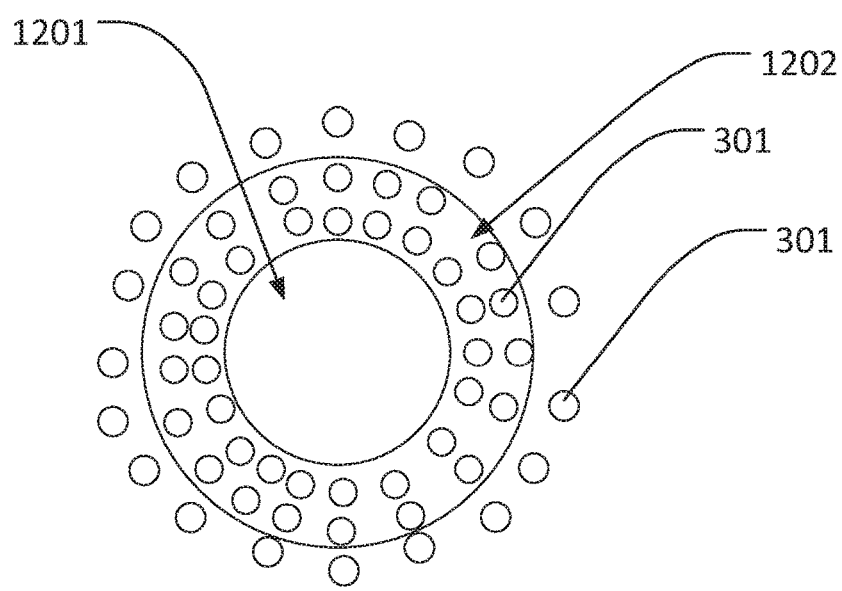
FIG. 2 is a plan view of a blind hole area provided by the present invention.

As shown in FIG. 2, a distribution of the second column spacers 301 in the blind hole area 120 is shown. The second column spacers 301 are provided in both the outer diameter area 1202 and the display area 110 adjacent to the outer diameter area 1202.

In preparing the display panel 100, based on a height difference formed between the second column spacers 302 and the first column spacers 301, as the color filter substrate 20 deforms during a vacuum assembly process, a deformation area of the blind hole area increases because the second column spacers 301 are not in contact with the array substrate 10 in the blind hole area 120, resulting in a decrease in a radius of curvature of the deformation of the blind hole area, thereby reducing an amount of deformation and avoiding poor focusing due to Newton's ring effect on the blind hole area.

The first column spacers 302 are made of an organic photoresist, and/or the second column spacers 301 are made of an organic photoresist.

The first column spacers 302 are provided with a height difference between 0.35 microns ($\mu$m) and 0.45 $\mu$m with the second column spacers 301.

The second column spacers 301 and the first column spacers 302 are staggered in the display area 110. Particularly, more the second column spacers 301 are provided in the display area 110 adjacent to the outer diameter area 1202.

The array substrate 10 includes a first glass substrate 101, a buffer layer 103, a thin-film transistor layer 104, and a first alignment film 105.

The buffer layer 103 is disposed on the first glass substrate 101.

The thin-film transistor layer 104 is disposed on the buffer layer 103 and is provided with a first combined hole 107 corresponding to the blind hole area 120. The first combined hole 107 extends through the thin-film transistor layer 104 to a surface of the buffer layer 103.

The first alignment film 105 is disposed on the thin-film transistor layer 104 in the first combined hole 107.

The first combined hole 107 includes a first through hole 1071 and a second through hole 1072. The first through hole 1071 has a radius less than that of the second through hole 1072, and the second through hole 1072 is provided above the first through hole 1071 and surrounds the first through hole 1071.

The first through hole 1071 is located corresponding to the inner diameter area. The second through hole 1072 is located corresponding to the outer diameter area and surrounds the first through hole 1071.

The color filter substrate 20 includes a second glass substrate 201, a black matrix layer 202, a transparent electrode layer 203, an RGB color resist 206, and a second combined hole 205.

The black matrix layer 202 is disposed on a side of the second glass substrate 201 adjacent to the array substrate 10. The transparent electrode layer 203 is disposed on the black matrix layer 202. The RGB color resist 206 is disposed in the black matrix layer 202 and the transparent electrode layer 203.

The second combined hole 205 is located corresponding to the blind hole area 120, and extends through the transparent electrode layer 203 and the black matrix layer 202 to a surface of the second glass substrate 201.

The second alignment film 204 is disposed on the transparent electrode layer 203 in the second combined hole 205.

The second combined hole 205 includes a third through hole 2051 and a fourth through hole 2052. The third through hole 2051 has a radius less than that of the fourth through hole 2052. The third through hole 2051 is provided above the fourth through hole 2052, and the fourth through hole 2052 surrounds the third through hole 2051.

The third through hole 2051 is located corresponding to the inner diameter area. The fourth through hole 2052 is located corresponding to the outer diameter area and surrounds the third through hole 2051.

The black matrix layer 202 surrounds the third through hole 2051, and the transparent electrode layer 203 surrounds the fourth through hole 2052.

Liquid crystal 303 is filled between the first alignment film 105 and the second alignment film 204 to form the liquid crystal layer 30. In the blind hole area 120, number of film layers in the blind hole area 120 can be reduced due to the presence of the combined holes, so that high light transmittance can be achieved.

Figure 3:
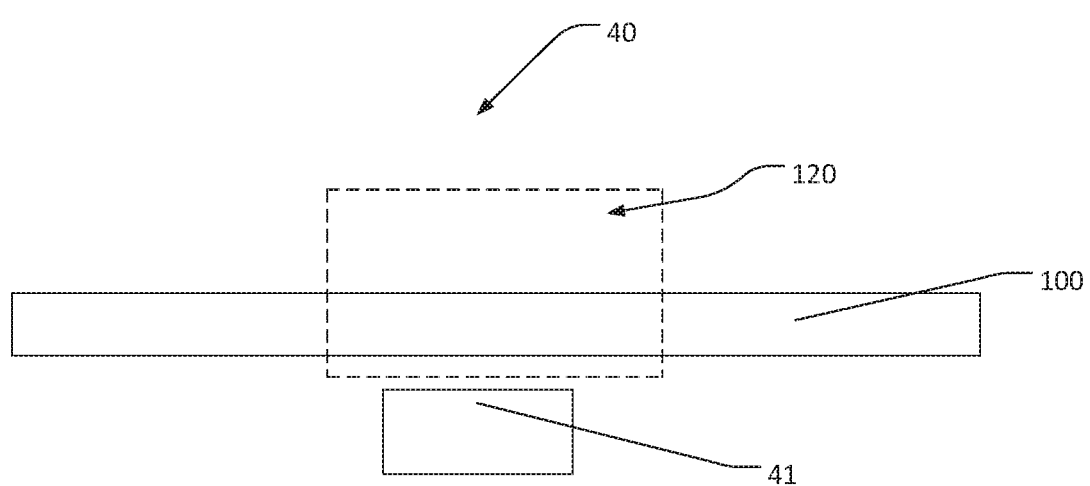
FIG. 3 is a schematic structural view of a display device provided by the present invention.

As shown in FIG. 3, the present invention further provides a display device 40 including the display panel 100 and a camera 41. The camera 41 is disposed below the display panel 100 and corresponding to the blind hole area 120.

The display panel 100 is provided with the plurality of second column spacers 301 disposed in both the outer diameter area 1202 and the display area 110 adjacent to the outer diameter area 1202. In preparing the display panel 100, based on a height difference formed between the second column spacers 302 and the first column spacers 301, as the color filter substrate 20 deforms during a vacuum assembly process, a deformation area of the blind hole area increases because the second column spacers 301 are not in contact with the array substrate 10 in the blind hole area 120, resulting in a decrease in a radius of curvature of the deformation of the blind hole area, thereby reducing an amount of deformation, avoiding poor focusing due to Newton's ring effect on the blind hole, and further improving shooting quality of the display device 40.

Accordingly, although the present invention has been disclosed as a preferred embodiment, it is not intended to limit the present invention. Those skilled in the art without departing from the spirit and scope of the present invention may make various changes or modifications, and thus the scope of the present invention should be after the appended claims and their equivalents.

What is claimed is:

1. A display panel, comprising:
   an array substrate comprising a blind hole area and a display area, wherein the blind hole area has an inner diameter area and an outer diameter area surrounding the inner diameter area;
   a liquid crystal layer disposed on the array substrate and comprising spacers, wherein the spacers comprise a plurality of first column spacers and a plurality of second column spacers, and the first column spacers have a height greater than that of the second column spacers; and
   a color filter substrate disposed on a side of the liquid crystal layer away from the array substrate;
   wherein the first column spacers are disposed in the display area and excluded from the blind hole area, one end of each of the first column spacers is connected to the array substrate, another end of each of the first column spacers is connected to the color filter substrate, the second column spacers are disposed in the display area and the outer diameter area, and the second column spacers are apart from the array substrate; and
   wherein in the display area, the spacers disposed in an area adjacent to the outer diameter area are the second column spacers.

2. The display panel of claim 1, wherein the first column spacers are made of an organic photoresist, and/or the second column spacers are made of an organic photoresist.

3. The display panel of claim 1, wherein the first column spacers are provided with a height difference between 0.35 microns (μm) and 0.45 μm with the second column spacers.

4. The display panel of claim 1, wherein the second column spacers and the first column spacers are alternately arranged in a horizontal direction in the display area.

5. The display panel of claim 1, wherein the array substrate comprises:
   a first glass substrate;
   a buffer layer disposed on the first glass substrate;
   a thin-film transistor layer disposed on the buffer layer and provided with a first combined hole corresponding to the blind hole area, wherein the first combined hole extends through the thin-film transistor layer to a surface of the buffer layer; and
   a first alignment film disposed on the thin-film transistor layer in the first combined hole.

6. The display panel of claim 5, wherein the first combined hole comprises a first through hole and a second through hole, wherein the first through hole has a radius less than that of the second through hole, and the second through hole is provided above the first through hole and surrounds the first through hole.

7. The display panel of claim 5, wherein the color filter substrate comprises:
   a second glass substrate;
   a black matrix layer disposed on a side of the second glass substrate adjacent to the array substrate;
   a transparent electrode layer disposed on the black matrix layer;
   an RGB color resist disposed in the black matrix layer and the transparent electrode layer, wherein the RGB color resist comprises a second combined hole corresponding to the blind hole area, and the second combined hole extends through the transparent electrode layer and the black matrix layer to a surface of the second glass substrate; and a second alignment film disposed on the transparent electrode layer in the second combined hole.

8. The display panel of claim 7, wherein the second combined hole comprises a third through hole and a fourth through hole, wherein the third through hole has a radius less than that of the fourth through hole, the third through hole is provided above the fourth through hole, and the fourth through hole surrounds the third through hole.

9. The display panel of claim 8, wherein the black matrix layer surrounds the third through hole, and the transparent electrode layer surrounds the fourth through hole.

10. A display device, comprising a display panel and a camera, wherein the display panel comprises:

an array substrate comprising a blind hole area and a display area, wherein the blind hole area has an inner diameter area and an outer diameter area surrounding the inner diameter area;

a liquid crystal layer disposed on the array substrate and comprising spacers, wherein the spacers comprise a plurality of first column spacers and a plurality of second column spacers, and the first column spacers have a height greater than that of the second column spacers; and a color filter substrate disposed on a side of the liquid crystal layer away from the array substrate;

wherein the first column spacers are disposed in the display area and excluded from the blind hole area, one end of each of the first column spacers is connected to the array substrate, another end of each of the first column spacers is connected to the color filter substrate, the second column spacers are disposed in the display area and the outer diameter area, and the second column spacers are apart from the array substrate; and wherein the camera is disposed below the display panel and corresponding to the blind hole area; and wherein in the display area, the spacers disposed in an area adjacent to the outer diameter area are the second column spacers.

11. The display device of claim 10, wherein the first column spacers are made of an organic photoresist, and/or the second column spacers are made of an organic photoresist.

12. The display device of claim 10, wherein the first column spacers are provided with a height difference between 0.35 microns (μm) and 0.45 μm with the second column spacers.

13. The display device of claim 10, wherein the second column spacers and the first column spacers are alternately arranged in a horizontal direction in the display area.

14. The display device of claim 10, wherein the array substrate comprises:

a first glass substrate;

a buffer layer disposed on the first glass substrate;

a thin-film transistor layer disposed on the buffer layer and provided with a first combined hole corresponding to the blind hole area, wherein the first combined hole extends through the thin-film transistor layer to a surface of the buffer layer; and a first alignment film disposed on the thin-film transistor layer in the first combined hole.

15. The display device of claim 14, wherein the first combined hole comprises a first through hole and a second through hole, wherein the first through hole has a radius less than that of the second through hole, and the second through hole is provided above the first through hole and surrounds the first through hole.

16. The display device of claim 14, wherein the color filter substrate comprises:

a second glass substrate;

a black matrix layer disposed on a side of the second glass substrate adjacent to the array substrate;

a transparent electrode layer disposed on the black matrix layer;

an RGB color resist disposed in the black matrix layer and the transparent electrode layer, wherein the RGB color resist comprises a second combined hole corresponding to the blind hole area, and the second combined hole extends through the transparent electrode layer and the black matrix layer to a surface of the second glass substrate; and a second alignment film disposed on the transparent electrode layer in the second combined hole.

17. The display device of claim 16, wherein the second combined hole comprises a third through hole and a fourth through hole, wherein the third through hole has a radius less than that of the fourth through hole, the third through hole is provided above the fourth through hole, and the fourth through hole surrounds the third through hole.

18. The display device of claim 17, wherein the black matrix layer surrounds the third through hole, and the transparent electrode layer surrounds the fourth through hole.

* * * * *